May 28, 1968 J. A. HIRSCH 3,386,013

SOLID STATE TIMER FOR A TWO COIL RELAY

Filed Sept. 30, 1965

INVENTOR
JAMES A. HIRSCH

BY [signature]

ATTORNEY 3,386,013

SOLID STATE TIMER FOR A TWO COIL RELAY

James A. Hirsch, Indianapolis, Ind., assignor to P. R. Mallory & Co. Inc., Indianapolis, Ind., a corporation of Delaware Filed Sept. 30, 1965, Ser. No. 491,632
8 Claims. (Cl. 317—142)

The present invention relates generally to timers and more particularly to the means and method for providing an electronic timer for controlling elements of an appliance.

In many equipment applications there exists a need for faithfully determining a given time period and then operating an element of the equipment. For example, in a copying machine, the exposure time is usually a critical step in the process and must be controlled. It is a desirable situation when an operator is able to press a button to start the exposure period and when a timing device ends the exposure period.

Accordingly, the present invention provides a novel, efficient and economical solution to the problem of obtaining an accurate time period and then operating a device or a mechanism. There is presented herein an electronic timer which has a solid state timing circuit for energizing an electronic switching means after a predetermined period of time and where said electronic switching means energizes a relay.

The practical and novel feature of the timer of the present invention is that the relay has a pair of identically wound coils connected in series so that current flowing through both of said coils produces a net magneto-motive force of essentially zero. The coils are also connected in series with a resistor to provide a voltage divider network for the electronic timer circuit. This combination of circuitry, which will be discussed in detail in this specification, permits the use of components having a wide range of operating characteristics. Other features of the present invention will be disclosed in the following paragraph.

It is an object of the present invention, therefore, to provide an electronic timer which will faithfully operate an element of an applicance after a predetermined time period.

It is a further object of the present invention to provide an electronic timer which is small, lightweight, and reliable.

It is a further object of the present invention to provide an electronic timer which can utilize a relay having a wide range of operating characteristics or tolerances and that will still provide an accurately timed operation of said relay.

It is still a further object of the present invention to provide an electronic timer which utilizes the two coils of a relay for part of a voltage divider network and where said coils are identically wound and connected in series so that current flowing through both of said coils produces a net magneto-motive force of essentially zero.

It is still a further object of the present invention to provide an electronic timer wherein a unijunction transistor timing circuit is used to fire a silicon controlled rectifier, thereby energizing a relay.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking, the present invention is an electronic timer comprising: an alternating current power source; a rectifying circuit means coupled thereto for providing a direct current voltage; a relay means for operating elements of an appliance being controlled by said timer, said relay means having a first coil and a second coil identically wound and coupled in series so that current flow through both of said coils produces a net magneto-motive force of essentially zero; a silicon controlled rectifier having an anode electrode, a gate electrode, and a cathode electrode; a circuit means connecting said anode electrode to a common midpoint between said first and said second coils; a circuit means for connecting said cathode electrode to a first side of said alternating current power source; a unijunction transistor timing circuit means for firing said silicon controlled rectifier after a predetermined time period connected to said gate electrode; and said second coil being effectively shorted out by firing of said silicon controlled rectifier to permit current flow through said first coil, thereby energizing said relay.

Figure 1:
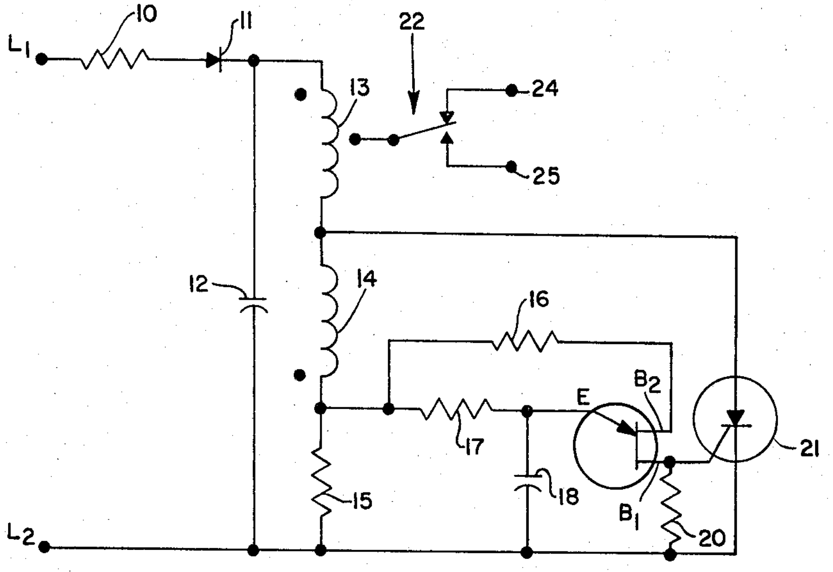
FIGURE 1 is a schematic of the electronic timer of the present invention.

Referring now to the drawing, and particularly to the schematic of FIGURE 1, the component parts of the electronic timer of this invention can be visualized in conjunction with the following description. An alternating current power source is applied across terminals L1 and L2 to provide the basic power for the electronic timer. A resistor 10 is coupled between L1 and the anode of the diode 11. A capacitor 12 is coupled across the cathode of the diode 11 and the terminal L2. A first relay coil 13, a second relay coil 14, and a resistor 15 are coupled in series across the capacitor 12. A silicon controlled rectifier 21 is coupled across the second relay coil 14 and the resistor 15. The anode of said silicon controlled rectifier 21 is connected to a midpoint between said first relay coil 13 and said second relay coil 14 and the cathode of said silicon controlled rectifier is coupled to the terminal L2. A timing circuit comprising resistor 16, resistor 17, capacitor 18, and unijunction transistor 19 is connected within the electronic timer to provide a time controlled pulse for firing the silicon controlled rectifier 21. The unijunction transistor 19 electrode B1 is connected to the gate electrode of the silicon controlled rectifier 21 and the unijunction transistor terminal B2 is connected through the resistor 16 to a midpoint between the second relay coil 14 and the resistor 15. The capacitor 18 is coupled across the emitter of the unijunction transistor 19 and the terminal L2 which is one side of the alternating current power source. The resistor 17 is coupled between the emitter of the unijunction transistor 19 and a midpoint between the second relay coil 14 and the resistor 15. A resistor 20 is coupled between the gate electrode of the silicon controlled rectifier 21 and the terminal L2. The moveable contact of the relay 22 is in contact with either terminal 24 or 25 which are service terminals for the electronic timer.

Figure 2:
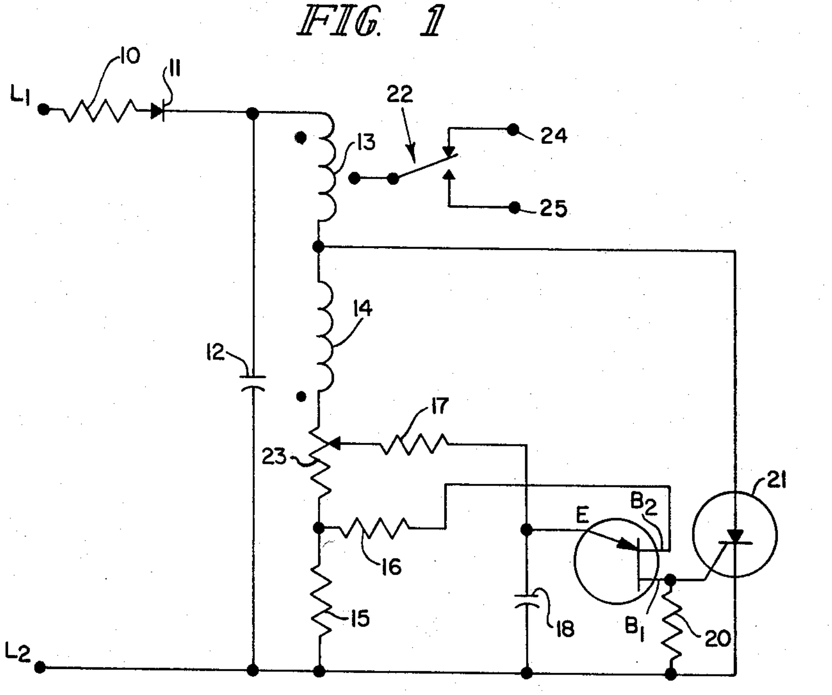
FIGURE 2 is a schematic of the electronic timer of the present invention wherein an adjustable resistor is added to adjust the supply voltage for the timing resistor thereby compensating for the effects of tolerance of the various components.

Referring now to FIGURE 2, we can see that the adjustable resistor 23 has been added in series with the first relay coil 13, second relay coil 14 and the resistor 15, said adjustable resistor being placed between said second relay coil 14 and said resistor 15. The purpose of the adjustable resistor 23 will be explained in conjunction with an operational analysis of the electronic timer of the present invention.

With the above description of components in mind and by making reference to the drawing figures, the following analysis of operation will serve to convey the functional details of the present invention. Referring again to FIGURE 1, we can see that the resistor 10, the diode 11 and the capacitor 12 comprise a half-wave rectifier circuit providing a direct current voltage across the first relay coil 13, the second relay coil 14, and the resistor 15. The first relay coil 13 and the second relay coil 14 and the resistor 15 form a voltage divider network for providing a source of interbase voltage for the unijunction transistor 19 at the midpoint between said second relay coil 14 and said resistor 15. The first relay coil 13 and the second relay coil 14 of the relay 22 are wound so that current flowing from either end of said coils towards the midpoint therebetween will produce flux in one direction. Hence, current flowing through both relay coils 13 and 14 in the same direction will provide a net magneto-motive force of essentially zero. This arrangement of the first relay coil 13 and the second relay coil 14 provides a novel and practical circuit for an electronic timer. The arrangement permits the use of a relay 22 with a greater range of operating characteristics than would be possible if the second relay coil 14 was a resistor. That is, if the second relay coil 14 was a resistor, current flowing through the first relay coil 13 and said resistor would produce a flux in said first relay coil that would depend on the variation of the input voltage and the tolerances of the components.

When power is first applied across L1 and L2, the silicon controlled rectifier 21 is not conducting and essentially no current flows out of the midpoint between the first relay coil 13 and the second relay coil 14. Consequently, the net magneto-motive force in said coil is opposing and the relay 22 does not operate.

The capacitor 18 is charged through the timing resistor 17 until the unijunction transistor 19 is triggered. When the unijunction transistor 19 is triggered, sufficient current can flow to the gate electrode of the silicon controlled rectifier 21 to cause said silicon controlled rectifier to conduct. When the silicon controlled rectifier 21 is conducting, the second relay coil 14 is effectively shorted out leaving the first relay coil 13 energized to operate the relay 22. The relay will remain operated until the circuit is reset by an interruption of power.

Referring again to FIGURE 2, we can see that the schematic is the same as that shown in FIGURE 1 except for the addition of the adjustable resistor 23 to provide a means for adjusting the supply voltage for the timing resistor 17 to compensate for the effects of tolerances of the various electronic timer components. The periodicity of the electronic timer is a function of the timing resistor 17, the capacitor 18, and the unijunction transistor 19.

There are obviously many applications for an electronic timer such as described in this application. For example, the electronic timer could be installed in a copying machine that requires a timed exposure. In that case, the operator of the machine would push a button to start the exposure and to start the electronic timer. After a period of time determined by the component values of the electronic timer, the relay 22 would be operated by the firing of the silicon controlled rectifier 21 to end the exposure period.

In general, the electronic timer of the present invention has a few basic elements. One of these elements is a rectifying circuit means for providing a direct current to the timing circuit means, the silicon controlled rectifier, and the relay means. The rectifying circuit means of the resistor 10, the diode 11 and the capacitor 12. The timing circuit is a means for firing the silicon controlled rectifier 21 after a predetermined time or a means for providing a time-controlled pulse to the gate electrode of said silicon controlled rectifier. The silicon controlled rectifier 21 is a means for energizing the relay 22. The relay 22 is a relay means having a pair of identically wound coils coupled in series so that current flow through either of said coils towards a midpoint therebetween will produce a flux in one direction.

The silicon controlled rectifier 21 used in the illustrative embodiment of the invention shown in FIGURE 1 and FIGURE 2 is a PNPN semiconductor having three terminals, an anode represented by the arrow symbol, a cathode represented by the line drawn through the apex of the arrow symbol and a gate represented by the diagonal line extending from the cathode. The silicon controlled rectifier can be used as an electronic switching means since the operating characteristics of a silicon controlled rectifier are such that it conducts in a forward direction with a forward characteristic very similar to that of an ordinary rectifier when a gate signal is applied. Thereafter, the controlled rectifier conducts even after the gate signal is removed provided a minimum holding current is supplid to said controlled rectifier. When a positive voltage is applied to the outside P layer and a negative voltage is supplied to the outside N layer, the two outside junctions are biased in a forward direction while the inner junctions are reversely biased. Under these conditions, current does not flow through the controlled rectifier except for a small leakage current. When the voltage is increased to a breakdown voltage, the current gain of the device increases to unity at which time the current through the controlled rectifier increases suddenly and becomes a function of the applied voltage and load impedance. Since a current pulse supplied to the gate lowers the breakdown voltage, the gate electrode can be used for controlling the firing of the controlled rectifier.

The unijunction transistor 19 used in the illustrative embodiment of the invention shown in FIGURE 1 and FIGURE 2 is a three terminal transistor including the base-one electrode B1, the base-two electrode B2, and an emitter E. If the voltage applied at the emitter is less than the peak point voltage of the unijunction transistor, the emitter is reversed biased and only a small leakage current will flow. If the applied emitter voltage equals or exceeds the peak point voltage, current will begin to flow and at this instant the unijunction transistor assumes a negative resistance characteristic, the resistance being inversely proportional to the current flowing thereto. Hence, the unijunction transistor is triggered.

All of the other components specified in the illustrative embodiment are self-explanatory and need not be discussed further in this specification.

The electronic timer of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. An electronic timer comprising: a source of direct current voltage; a relay means for operating elements of an appliance being controlled by said timer, said relay means having a first coil and a second coil identically wound and coupled in series so that current flow through both of said coils produces a net magneto-motive force of essentially zero; an electronic switching means; a circuit means for connecting said electronic switching means from a midpoint between said first and said second coils and a first side of said direct current voltage source; a means for energizing said electronic switching means after a predetermined time period connected thereto; and said second coil being effectively shorted out by said electronic switching means to permit current flow through said first coil, thereby energizing said relay.

2. An electronic timer comprising: an alternating current power source; a rectifying circuit means coupled thereto for providing a direct current voltage; a relay means for operating elements of an appliance being controlled by said timer, said relay means having a first coil and a second coil identically wound and coupled in series so that current flow through both of said coils produces a net magneto-motive force of essentially zero; a silicon controlled rectifier having an anode electrode, a gate electrode, and a cathode electrode; a circuit means connecting said anode electrode to a common midpoint between said first and said second coils; a circuit means for connecting said cathode electrode to a first side of said alternating current power source; a means for firing said silicon controlled rectifier after a predetermined time period connected to said gate electrode; and said second coil being effectively shorted out by firing of said silicon controlled rectifier to permit current flow through said first coil, thereby energizing said relay.

3. An electronic timer comprising: an alternating current power source; a rectifying circuit means coupled thereto for providing a direct current voltage; a relay means for operating elements of an appliance being controlled by said timer, said relay means having a first coil and a second coil identically wound and coupled in series so that current flow through both of said coils produces a net magneto-motive force of essentially zero; a silicon controlled rectifier having an anode electrode, a gate electrode, and a cathode electrode; a circuit means connecting said anode electrode to a common midpoint between said first and said second coils; a circuit means for connecting said cathode electrode to a first side of said alternating current power source; a unijunction transistor timing circuit means for firing said silicon controlled rectifier after a predetermined time period connected to said gate electrode; and said second coil being effectively shorted out by firing of said silicon controlled rectifier to permit current flow through said first coil, thereby energizing said relay.

4. An electronic timer comprising: an alternating current power source; a rectifying circuit means coupled thereto for providing a direct current voltage; a relay means for operating elements of an appliance being controlled by said timer, said relay means having a first coil and a second coil identically wound and coupled in series so that current flow through both of said coils produces a net magneto-motive force of essentially zero; an electronic switching means coupled to a midpoint between said coils for shorting out said second coil, thereby energizing said relay; and a timing circuit means for energizing said electronic switching means after a predetermined period of time, said timing circuit means being connected to said electronic swtchng means.

5. An electronic timer comprising: an alternating current power source; a rectifying circuit means coupled across said alternating current power source for providing a direct current voltage; a relay having a first coil and a second coil connected in series with a resistor across said rectifying crcuit means to form a voltage divider network; said first coil and said second coil being identically wound so that current flowing through said coils produces a net magneto-motive force of essentially zero; a silicon controlled rectifier having an anode, a cathode and gate electrodes, said silicon controlled rectifier being coupled from a midpoint between said first coil and said second coil and a first side of said alternating current power source; a unijunction transistor timing circuit means for providing a pulse to said gate electrode of said silicon controlled rectifier after a predetermined time period, thereby firing said silicon controlled rectifier; and said second coil being effectively shorted out by firing of said silicon controlled rectifier to permit current flow through said first coil, thereby energizing said relay.

6. An electronic timer comprising: an alternating current power source; a rectifying circuit means coupled across said alternating current power source for providing a direct current voltage; a relay having a first coil and a second coil connected in series with a resistor across said rectifying circuit means to form a voltage divider network; said first coil and said second coil being identically wound so that current flowing through both of said coils produces a net magneto-motive force of essentially zero; a silicon controlled rectifier having an anode, a cathode and gate electrodes, said silicon controlled rectifier being coupled from a midpoint between said first coil and said second coil and a first side of said alternating current power source; a unijunction transistor timing circuit means coupled to a midpoint between said second relay coil and said resistor for providing a pulse to a gate electrode of said silicon controlled rectifier after a predetermined time period, thereby firing said silicon controlled rectifier; said second coil being effectively shorted out by firing of said silicon controlled rectifier to permit current flow through said first coil, thereby energizing said relay.

7. An electronic timer comprising: an alternating current power source; a rectifying circuit means coupled across said alternating current power source for providing direct current voltage, said rectifying circuit means consisting of a first resistor, a diode and a first capacitor connected in series; a voltage divider network consisting of a first and a second coil of a relay and a second resistor connected in series across said first capacitor, said first and second relay coils being identically wound so that current flowing through said coils produces a net magneto-motive force of essentially zero; a silicon controlled rectifier having an anode, a cathode and gate electrodes, said silicon controlled rectifier being coupled to said midpoint between said first and second relay coils and a first side of said alternating current power source; a unijunction transistor having a base-one, a base-two and emitter electrodes; a second capacitor connected between said emitter electrode of said unijunction transistor and said first side of said alternating current power source; a third resistor connected between said emitter electrode of said unijunction transistor and a midpoint between said second relay coil and said second resistor; a fourth resistor connected from said base-two electrode of said unijunction transistor to said midpoint between said second relay coil and said second resistor; a fifth resistor connected from said base-one electrode of said unijunction transistor to said first side of said alternating current power source; a circuit means for connecting said base-one electrode of said unijunction transistor to said gate electrode of said silicon controlled rectifier, thereby firing said silicon controlled rectifier when said unijunction transistor is triggered; said unijunction transistor being triggered by a voltage developed across said second capacitor through said third resistor; and said second relay coil being effectively shorted out by firing of said silicon controlled rectifier to permit current flow through said first relay coil, thereby energizing said relay.

8. An electronic timer comprising: a source of direct current voltage; a relay having a first and a second identically wound coils connected in series so that current flowing through both of said coils will produce a net magneto-motive force of essentially zero; an electronic switching means for shorting out said second relay coil, thereby energizing said relay; a circuit means connecting said electronic switching means to a common midpoint between said first and said second relay coils; and a solid state circuit means for energizing said electronic switching means after a predetermined time period coupled thereto.

References Cited

UNITED STATES PATENTS

| | | | |
|---|---|---|---|
| 3,133,275 | 5/1964 | Cohrt et al. | 317—155.5 |
| 3,155,879 | 11/1964 | Casey et al. | 317—148.5 |
| 3,162,772 | 12/1964 | Smith | 317—148.5 |
| 3,250,891 | 5/1966 | Pease | 317—198.5 |
| 3,277,348 | 10/1966 | Trush | 317—142 |
| 3,325,696 | 6/1967 | Dallemagne | 317—155.5 |

MILTON O. HIRSHFIELD, *Primary Examiner.*

R. V. LUPO, *Assistant Examiner.*